United States Patent
Maier-Landgrebe

(10) Patent No.: US 9,989,934 B2
(45) Date of Patent: Jun. 5, 2018

(54) METHOD FOR CONTROLLING THE ROTATIONAL SPEED OF A MOTOR

(71) Applicant: Robert Bosch GmbH, Stuttgart (DE)

(72) Inventor: Rolf Maier-Landgrebe, Kernen (DE)

(73) Assignee: ROBERT BOSCH GMBH, Stuttgart (DE)

(*) Notice: Subject to any disclaimer, the term of this patent is extended or adjusted under 35 U.S.C. 154(b) by 305 days.

(21) Appl. No.: 14/672,433

(22) Filed: Mar. 30, 2015

(65) Prior Publication Data
US 2015/0293543 A1 Oct. 15, 2015

(30) Foreign Application Priority Data
Apr. 10, 2014 (DE) .................. 10 2014 206 909

(51) Int. Cl.
| H02P 1/00 | (2006.01) |
| G05B 11/42 | (2006.01) |
| B60W 20/00 | (2016.01) |
| F02D 29/02 | (2006.01) |
| H02P 29/00 | (2016.01) |
| B60L 15/20 | (2006.01) |
| F02D 31/00 | (2006.01) |
| H02P 23/00 | (2016.01) |
| F02D 41/14 | (2006.01) |

(52) U.S. Cl.
CPC .............. *G05B 11/42* (2013.01); *B60L 15/20* (2013.01); *B60W 20/00* (2013.01); *F02D 29/02* (2013.01); *F02D 31/001* (2013.01); *H02P 23/0004* (2013.01); *H02P 29/0016* (2013.01); *F02D 2041/1409* (2013.01); *F02D 2200/101* (2013.01); *F02D 2200/1012* (2013.01); *G05B 2219/2623* (2013.01)

(58) Field of Classification Search
CPC .......... H02P 23/20; H02P 23/30; H02P 21/30; G05B 19/256; G05B 19/235; G05B 19/376; G05B 19/356; G05B 19/416; G05B 2219/36521; G05B 2219/37319; G05B 2219/37321; G05B 2219/37322; G05B 2219/37323; G05B 2219/37324; G05B 2219/37388; G05B 2219/39247; G05B 2219/41157; G05B 2219/42064; G05B 2219/43
USPC ......................................................... 318/259
See application file for complete search history.

(56) References Cited

U.S. PATENT DOCUMENTS

| 3,288,160 A * | 11/1966 | Eggenberger | F01D 17/24 137/48 |
| 4,992,715 A * | 2/1991 | Nakamura | H02P 29/0016 318/432 |
| 5,416,397 A * | 5/1995 | Mazzara | H02P 6/006 318/135 |
| 5,936,369 A * | 8/1999 | Iwashita | G05B 19/19 318/609 |

(Continued)

*Primary Examiner* — Bickey Dhakal
(74) *Attorney, Agent, or Firm* — Norton Rose Fulbright US LLP; Gerard Messina

(57) ABSTRACT

A method a speed controller includes reading in an actual angular acceleration value of a motor, comparing the actual angular acceleration value to a setpoint angular acceleration value, determining a controller output torque of an integrating I-component of the speed controller based on the comparison, and controlling the rotational speed of the motor based on the determined controller output torque.

6 Claims, 1 Drawing Sheet

(56) References Cited

U.S. PATENT DOCUMENTS

| 6,428,282 B1* | 8/2002 | Langley | F04D 27/004 |
| | | | 417/2 |
| 2006/0179859 A1* | 8/2006 | Nakata | H02P 6/06 |
| | | | 62/228.1 |

* cited by examiner

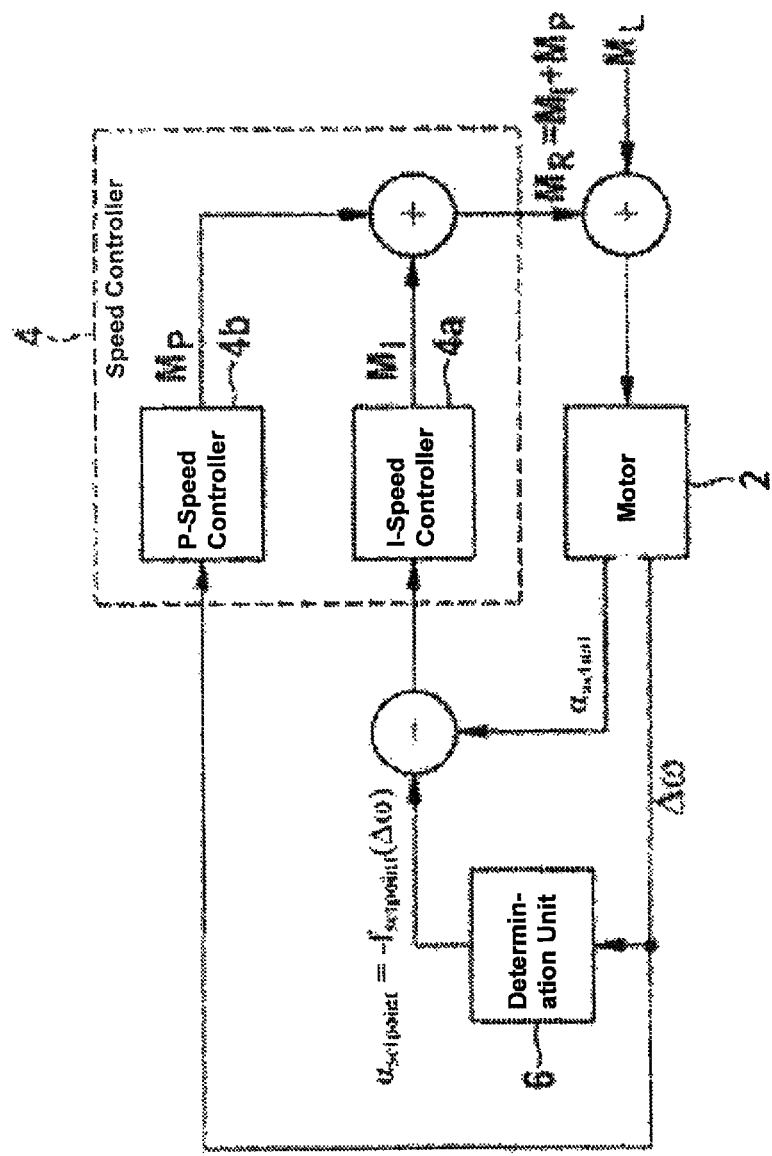

METHOD FOR CONTROLLING THE ROTATIONAL SPEED OF A MOTOR

FIELD OF THE INVENTION

The present invention relates to a method for controlling the rotational speed of a motor.

BACKGROUND

To control the rotational speed of motors, for example, electric motors or internal combustion engines, PI controllers may be used, which include various parameter sets having parameters (proportional coefficient and integral coefficient) for the PI controller for various operating states. Furthermore, it is possible to enhance PI controllers with a differential component to form a PID controller.

The largest disturbing variable in a rotational speed control loop is the load coupled to the motor, which, during operation, may vary over a large range of values within a short time, for example, due to the connection of loads of a motor vehicle such as an air conditioner or power steering, or due to changing driving resistances when coasting.

In order to avoid steady-state control deviations, the speed controller includes an integrating I-component which compensates for the deviations in the load. The integrating I-component is determined as a function of the control deviation. However, because of the integration, this results in a larger phase delay which makes a phase-gaining differentiating D-component of the speed controller necessary.

Therefore, there is a need for a better way to achieve a control quality than that of previous PI(D) controllers.

SUMMARY

According to the present invention, a method for controlling the rotational speed of a motor and an arithmetic unit for carrying it out are provided.

One significant aspect of the present invention is that in an example method for controlling the rotational speed or angular velocity of a rotor of a motor, the integrating I-component of the controller output torque of a speed controller is determined based on the comparison between an actual angular acceleration value and a setpoint angular acceleration value. The motor can be an internal combustion engine or an electric motor (for example, a hybrid drive) of a motor vehicle. The speed controller can, for example, be designed as a traction control system.

A motor generally an I-component with an integrating behavior. Since acceleration values are used instead of velocity values, the resulting phase shift is reduced. Thus, it is possible to omit an additional differentiating D-component. Furthermore, the setpoint angular velocity (i.e., setpoint rotational speed) is a function only of the known gain of the proportional P-component of the speed controller and of the moment of inertia of the motor (i.e., rotor), which only changes slowly and is easy to adapt. Therefore, the behavior is particularly immune to disturbance with respect to parameter deviations. In addition, the speed controller according to the present invention compensates for the load as a disturbing variable more rapidly than a conventional PI(D) controller, since the load is compensated for based on acceleration values. Finally, the speed controller is simple to apply, since, as mentioned above, the setpoint angular velocity is preferably determined only by the gain of the proportional P-component of the speed controller and by the moment of inertia of the motor, while the compensation for the load is determined with the aid of the integration factor of the integrating I-component.

According to an example embodiment, the setpoint angular acceleration value is determined from a deviation between an actual angular velocity and a setpoint angular velocity (also referred to below as control deviation), using a characteristic curve. As a result, it is also possible to use the speed controller for motors with a nonlinear behavior.

According to an example embodiment, the setpoint angular acceleration value is determined by multiplying the control deviation by a constant. As a result, it is possible to use a speed controller with a simple design for controlling the rotational speed of motors with a linear behavior.

According to an example embodiment, a controller output torque of a proportional P-component of the speed controller is determined which, added to the controller output torque of the integrating I-component, then forms the total controller output torque of the speed controller. The controller output torque of the proportional P-component is advantageously determined from the control deviation, i.e., a difference in angular velocity. As a result, an additional improvement of the control system is achieved, since angular velocities are taken into account in addition to angular accelerations.

According to an example embodiment, the constant is a quotient formed from a controller coefficient and a moment of inertia of the motor. The controller coefficient is a gain of the proportional P-component of the speed controller. As a result, it is possible to determine the setpoint angular acceleration value in a particularly simple manner, without an additional differential element and without additional acceleration sensors.

According to an example embodiment of the present invention, an arithmetic unit, for example, a speed controller for a motor, is configured, in particular via programming, to carry out a method according to the present invention.

The implementation of the method using software is also advantageous, since this entails particularly low costs, in particular if an executing arithmetic unit is also used for additional tasks and is therefore present in any case. Suitable data carriers for providing the computer program in particular include diskettes, hard disks, flash memories, EEPROMs, CD-ROMs, DVDs, and others. A download of a program via computer networks (Internet, intranet, etc.) is also possible.

Additional advantages and embodiments of the present invention result from the description and the attached drawing. The present invention is schematically depicted in the drawing based on an example embodiment and is described in greater detail below with reference to the drawing. The aforementioned features and the features explained below are applicable not only in each specified combination, but also in other combinations or alone, without departing from the scope of the present invention.

BRIEF DESCRIPTION OF THE DRAWINGS

FIG. 1 shows a schematic representation of a control loop according to an example embodiment of the present invention.

DETAILED DESCRIPTION

FIG. 1 shows, according to an example embodiment of the present invention, a control loop that includes a motor 2 and a speed controller 4. The motor 2 is an internal combustion engine or an electric motor of a hybrid drive for driving a motor vehicle. Speed controller 4 can be designed for controlling the idle and final rotational speed of motor 2, or can be a component of a traction control system. Speed controller 4 can be part of an arithmetic unit, for example, of an engine controller of a motor vehicle.

Motor 2 includes a rotor (not shown), for example, a rotor of the electric motor or a crankshaft of the internal combustion engine. The rotor has a moment of inertia J and rotates during operation with an actual angular velocity value $\omega_{actual}$, a load torque $M_L$ being present at motor 2. Speed controller 4 is configured to regulate actual angular velocity $\omega_{actual}$ to a setpoint angular velocity $\omega_{setpoint}$.

As long as a controller output torque $M_R$ of speed controller 4 corresponds exactly to the applied load torque $M_L$, no angular acceleration results, and the rotor of motor 2 rotates having a constant actual angular velocity value $\omega_{actual} = \omega_{setpoint}$.

Changes in the angular velocity are therefore caused by a difference between controller output torque $M_R$ and load torque $M_L$. According to the principle of angular momentum, the following applies to the time derivative of the control deviation $(\Delta\omega = (\omega_{actual} - \omega_{setpoint}))$ between the actual angular velocity and the setpoint angular velocity, which corresponds to an angular acceleration:

$$J\dot{\Delta\omega} = (M_R - M_L) \quad (1)$$

Therefore, motor 2 has an integrating behavior, i.e., it behaves like an integrator or like an I-element in the control loop.

Controller output torque $M_R$ of speed controller 4 is composed of an integrating I-component $M_I$ and another typically proportional P-component $M_P$:

$$M_R = M_I + M_P \quad (2)$$

Speed controller 4 includes an I-speed controller 4a for determining integrating I-component $M_I$, and speed controller 4 includes a P-speed controller 4b for determining proportional P-component $M_P$.

Ideally, in such a regulating system, I-component $M_I$ compensates exactly for (continuous or static) load torque $M_L$. Accordingly, equation (1) yields the following:

$$\dot{\Delta\omega} = \frac{M_R - M_I}{J} \quad (3)$$

Therefore, this $\dot{\Delta\omega}$ ideally represents a setpoint angular acceleration value $\alpha_{setpoint}$.

If load torque $M_L$ is constant, other disturbances may be compensated for via P-component $M_P$.

If P-speed controller 4b is designed as a linear controller, setpoint angular acceleration value $\alpha_{setpoint}$ is determined by a determination unit 6 as an input value of P-speed controller 4b by multiplying angular velocity control deviation $\Delta\omega$ by a constant which is a quotient formed from a controller coefficient $K_P$ of proportional component $M_P$ of speed controller 4 and moment of inertia J of motor 2:

$$\alpha_{setpoint} = -\frac{K_P}{J}\Delta\omega$$

In the present exemplary embodiment, as a generalization, P-speed controller 4b is designed as a nonlinear controller. As an input value of P-speed controller 4b, each setpoint angular acceleration value $\alpha_{setpoint}$ is read out or determined from a stored characteristic curve $f_{setpoint}(\Delta\omega)$ by determination unit 6 for determining setpoint angular acceleration value $\alpha_{setpoint}$ as a function of angular velocity control deviation $\Delta\omega$:

$$\alpha_{setpoint} = -f_{setpoint}(\Delta\omega)$$

If the load remains unchanged during operation, i.e., the control loop is not disturbed by a load, load torque $M_L$ is equal to I-component $M_I$. However, load torque $M_L$ is the largest disturbing variable in the control loop. Load torque $M_L$ may vary over a large value range in a short time, for example, due to the connection of loads such as an air conditioner or power steering of a motor vehicle, or due to changing driving resistances when coasting. In these situations, $M_I$ must preferably be rapidly adapted to the changed load. Controller output torque $M_I$ of the integrating I-component of speed controller 4 is determined based on the difference between setpoint angular acceleration value $\alpha_{setpoint}$ and actual angular acceleration value $\alpha_{actual}$:

$$M_I = K_I \int (\alpha_{setpoint} - \alpha_{actual}) dt$$

The integrating I-component $M_I$ thus operates with integral gain $K_I$. Within the scope of the present invention, the I-component is thus determined as a function of the deviation between the setpoint angular acceleration and the actual angular acceleration, which results in it achieving a steady-state final value (corresponding to the load torque) earlier than in the case of a determination from the control deviation between the actual angular velocity and the setpoint angular velocity.

If I-speed controller 4a is designed as a nonlinear controller, a nonlinear gain g of the difference between setpoint angular acceleration value $\alpha_{setpoint}$ and actual angular acceleration value $\alpha_{actual}$ may be used:

$$M_I = \int g(\alpha_{setpoint} - \alpha_{actual}) dt$$

If I-speed controller 4a is designed as a linear controller, controller output torque $M_I$ of integrating I-component $M_I$ of I-speed controller 4a is determined as:

$$M_I = -K_I \int \left(\frac{K_P}{J}\omega + \alpha_{actual}\right) dt$$

Integral gain $K_I$ of integrating I-component $M_I$ of I-speed controller 4a may be determined by solving this differential equation, as known per se.

What is claimed is:

1. A method comprising a motor speed controller performing the following:
   determining a controller output torque of a proportional P-component of the motor speed controller;
   determining a deviation between an actual angular velocity of a motor and a setpoint angular velocity;
   multiplying the determined deviation by a quotient formed from a controller coefficient of the proportional P-component of the motor seed controller and a moment of inertia of the motor to determine a setpoint angular acceleration value of the motor;
   comparing an actual angular acceleration value and the setpoint angular acceleration value;
   determining a controller output torque of an integrating I-component of the motor speed controller based on the comparison of the actual angular acceleration value and the setpoint angular acceleration value;

determining a total controller output torque of the motor speed controller from the controller output torques of the proportional P-component and integrating I-component; and controlling a rotational speed of the motor based on the determined total controller output torque.

2. The method of claim 1, wherein a characteristic curve is used for the determination of the setpoint angular acceleration.

3. The method of claim 1, wherein the setpoint angular acceleration value is determined by multiplying the deviation between the actual angular velocity and the setpoint angular velocity by a constant.

4. The method of claim 1, wherein, based on a value of the controller output torque of the integrating I-component at a first point in time, a value of the controller output torque of the integrating I-component at a second point in time is determined, the second point in time being later than the first point in time.

5. An arithmetic unit comprising processing circuitry, wherein the processing circuitry is configured to:
   determine a controller output torque of a proportional P-component of a motor speed controller;
   determine a deviation between an actual angular velocity of a motor and a setpoint angular velocity;
   multiply the determined deviation by a quotient formed from a controller coefficient of the proportional P-component of the motor speed controller and a moment of inertia of the motor to determine a setpoint angular acceleration value of the motor;
   compare an actual angular acceleration value and the setpoint angular acceleration value;
   determine a controller output torque of an integrating I-component of the motor speed controller based on the comparison of the actual angular acceleration value and the setpoint angular acceleration value;
   determine a total controller output torque of the motor speed controller from the controller output torques of the proportional P-component and integrating I-component; and
   control a rotational speed of the motor based on the determined total controller output torque.

6. A non-transitory computer-readable medium on which are stored instructions that are executable by a processor and that, when executed by the processor, cause the processor to perform a method, the method comprising:
   determining a controller output torque of a proportional P-component of a motor speed controller;
   determining a deviation between an actual angular velocity of a motor and a setpoint angular velocity;
   multiplying the determined deviation by a quotient formed from a controller coefficient of the proportional P-component of the motor speed controller and a moment of inertia of the motor to determine a setpoint angular acceleration value of the motor;
   comparing an actual angular acceleration value and the setpoint angular acceleration value;
   determining a controller output torque of an integrating I-component of the motor speed controller based on the comparison of the actual angular acceleration value and the setpoint angular acceleration value;
   determining a total controller output torque of the motor speed controller from the controller output torques of the proportional P-component and integrating I-component; and
   controlling a rotational speed of the motor based on the determined total controller output torque.

* * * * *